(12) United States Patent
Dyner

(10) Patent No.: US 6,478,432 B1
(45) Date of Patent: Nov. 12, 2002

(54) DYNAMICALLY GENERATED INTERACTIVE REAL IMAGING DEVICE

(76) Inventor: Chad D. Dyner, 1933 Manning Ave., Los Angeles, CA (US) 90025

( * ) Notice: Subject to any disclaimer, the term of this patent is extended or adjusted under 35 U.S.C. 154(b) by 0 days.

(21) Appl. No.: 09/905,737

(22) Filed: Jul. 13, 2001

(51) Int. Cl.[7] .................................................. G02B 5/10
(52) U.S. Cl. ........................ 359/858; 359/730; 353/99; 345/175
(58) Field of Search ................................ 359/365, 727, 359/728, 730, 857, 858, 478, 479; 353/99; 345/173, 175

(56) References Cited

U.S. PATENT DOCUMENTS

| | | |
|---|---|---|
| 3,609,695 A | 9/1971 | Pirkle ....................... 340/172.5 |
| 3,647,284 A | 3/1972 | Elings et al. |
| 3,774,995 A | 11/1973 | Perret |
| 3,885,096 A | 5/1975 | Inuiya .......................... 178/15 |
| 3,893,754 A | 7/1975 | McInally |
| 4,094,501 A | 6/1978 | Burnett |
| 4,459,476 A | 7/1984 | Weissmueller et al. ..... 250/221 |
| 4,517,559 A | 5/1985 | Deitch et al. ............... 340/712 |
| 4,802,750 A | 2/1989 | Welck ......................... 350/619 |
| 5,059,959 A | 10/1991 | Barry .......................... 340/709 |
| 5,168,531 A | 12/1992 | Sigel ............................ 382/48 |
| 5,257,130 A | 10/1993 | Monroe ....................... 359/478 |
| 5,311,357 A | 5/1994 | Summer et al. ............ 359/479 |
| 5,424,756 A * | 6/1995 | Ho et al. ..................... 345/158 |
| 5,495,306 A | 2/1996 | Shibazaki ..................... 353/99 |
| 5,515,079 A | 5/1996 | Hauck ......................... 345/157 |
| 5,515,083 A | 5/1996 | Casebolt et al. ............ 345/175 |
| 5,572,375 A * | 11/1996 | Crabtree, IV ............... 359/479 |
| 5,619,382 A | 5/1997 | Kato et al. .................. 359/858 |
| 5,694,142 A | 12/1997 | Dumoulin et al. ............. 345/9 |
| 5,767,842 A | 6/1998 | Korth .......................... 345/168 |
| 5,812,118 A | 9/1998 | Sheih .......................... 345/173 |
| 5,821,911 A | 10/1998 | Jachimowicz .................. 345/7 |
| 5,896,237 A | 5/1999 | Blackmon, Jr. ............. 359/858 |
| 6,064,354 A | 5/2000 | DeLuca .......................... 345/7 |
| 6,100,862 A | 8/2000 | Sullivan ....................... 345/88 |
| 6,231,199 B1 * | 5/2001 | Li ............................... 359/857 |

\* cited by examiner

Primary Examiner—Mark A. Robinson
(74) Attorney, Agent, or Firm—Sanford Astor

(57) ABSTRACT

This invention comprises a method and apparatus for displaying full color, high resolution dynamically generated real images and allowing the user to have direct interaction with the image. This input/output device provides an intuitive computer/video interface that permits the operator to grab, translate and manipulate a real image. The apparatus comprises a pair of coaxially positioned parabolic mirrors and a video imaging device allowing for 360 degree viewing. The real image, that appears floating within the opening of a viewport, is completely interactive by means of a detection system that tracks the operator, allowing the user to place his/her hand or finger through the image and engage it. Applications for this device are wide ranging, and include, for example, computer-aided design (CAD) and the entertainment/gaming industry by abandoning the conventional keyboard and mouse and allowing the user to have direct contact with the image.

20 Claims, 3 Drawing Sheets

DYNAMICALLY GENERATED INTERACTIVE REAL IMAGING DEVICE

This invention is described in my Disclosure Document No. 493398, filed on May 11, 2001.

BACKGROUND OF THE INVENTION

1. Field of the Invention

This invention is directed generally at improvements in input/output devices that relate to computer user interfaces and video imaging/viewing that could benefit from user interaction.

2. Background Art

This highly intuitive interface relates to human/image interaction in a familiar fashion to touching, grabbing and manipulating objects in the real world. The present invention incorporates an imaging display that projects what appears to the human eye to be a floating image. The experience is further enhanced by the ability to manipulate the image as if it existed in the real world. This overall engaging experience is not possible with existing devices.

There are numerous types of approaches to trick the human eye into believing that an image exists in a different location. In the past these various techniques provided the eye with visual depth cues, giving the illusion of viewing a three-dimensional image that appears from a flat surface. These types of technologies include stereoscopic viewing, which restricts a separate image seen by either eye. fooling the brain to mentally reconstruct a composite image that appears to float above the actual image. Other methods include anaglyph (red/blue glasses), polarized, alternating-field (liquid crystal display (LCD) shutter glasses), lenticular screens and chromatic displacement or ClromaDepth® (flat holographic "prisms" displace colors so reds appear closest and blues farthest). This invention uses none of these techniques, liberating the user from wearing any extra equipment such as goggles.

In the prior art, ellipsoidal imaging mirrors are known in which an object or light source positioned at the first focal point is imaged by the mirror at the second focal point of the ellipsoid, McNally's U.S. Pat. No. 3,893,754. The present invention recognizes a general relationship with the overall mirror geometry of the Elings' U.S. Pat. No. 3,647,284, employing this well known optical principle, but applying it to a novel use of dynamic real-time imaging, offering a number of advantages not possible in Elings. The most obvious drawback of the Elings' device was that the image being viewed was a static object and offered no degree of interactivity. Other variations, such as Welck's U.S. Pat. No. 4,802,750 has numerous disadvantages including the fact that the orientation of the two mirrors provides limited viewing only from the front of the device. This is solved as described by Welk, by rotating the entire enclosure on a turntable. In Summer's U.S. Pat. No. 5,311,357 and Monroe's U.S. Pat. No. 5,257,130 there is the same restricted viewing angle, although the incorporation of a television cathode ray tube (CRT) or projector allowed for a dynamic image, yet lacked any degree of interactivity. Furthermore, the exterior dimensions of the unit limit its application to permanent installations that are better suited for exhibition type events. While various variations of this principle in the aforementioned art have been employed, none offered the degree of flexibility of this device; dynamic imaging and interaction in a portable unit.

The present invention creates an environment that is a more natural interface, improving the overall computer and/or video display experience. Currently the mouse and keyboard serve as the standard input devices that are relics of the past, the keyboard a remnant of the typewriter. While the advent of the touchscreen has added a more unencumbered input method, it is limited by the surface of the image occurring behind the screen. Since the present invention contains no viewing screen, such as in a conventional television or computer monitor, the user can actually grab the image and engage it by placing one's fingers through the image to interact with it. This is quite different than touching the surface of a touch screen, where the operator is cognizant of touching a surface that is above an image contained within a monitor or box. The input/output device of this invention is a vast improvement in the development of computer and video display interfaces.

BRIEF SUMMARY OF THE INVENTION

This invention is a robust solid state method of producing dynamic interactive real images in a relatively small size, allowing the device to be portable with a user-friendly interface. This embodiment reduces the number of parts to the bare essentials and contains virtually no moving components, which is advantageous to provide high real world reliability, low maintenance and relatively low cost of manufacturing by not being processor intensive. The further ability to connect to existing external video devices allows the unit to integrate with existing display infrastructures, such as with any current video signal (videotape, DVD, TV or videogame) including a computer display signal. Furthermore, this may include a portable power source comprising a battery pack, allowing for independent operation without the need of a power outlet.

The device of this invention acts as an interface between the image and the user, serving as an input/output device with almost limitless capabilities. Traditional imaging devices require a separate display and input device, detaching the actual input function and executed response. The device doesn't rely on any peripheral input devices, liberating the operator to freely work or play in an accustomed real world fashion. The user can now write/draw or type in a virtual environment without the use of peripheral devices, and actually handle a virtual object as if it were present in real space. Existing technology is limited to the actual tactile process, which does not allow the image to actually be engaged but rather the user must touch the CRT or LCD surface in front of the image, such as Weissmueller's Co-ordinate detection system, U.S. Pat. No. 4,459,476. This invention provides a method that allows the operator to place his/her hand through the image and therefore provide a completely different experience in which the operator's hand appears to be in actual contact with the image. Therefore, if an artist were to choose a real, physical paint brush, and place it within the detection grid, the "paint" would occur at the location where the bristles interrupt the detection grids; dependent on the thickness of the paintbrush. If the artist chooses a fine tipped pencil, then the result would be a much finer line, that is defined by the silhouette of the tip. Coupled with the ability to integrate software to modify user defined parameters, the invention allows further user flexibility and user customization.

General functions that were previously executed with the mouse are now replaced by the user's finger or stylus. Because the operator is not constrained by the physical limitations of the keyboard and mouse, there is no risk of carpal tunnel syndrome linked to long periods of typing. The ability to use existing handwriting software packages (character recognition) further allows users to input text through writing, a more natural movement. There is no need for any peripheral devices (mouse, keyboard or other input devices) to clutter the user's desk space while providing complete flexibility. Instead, the space within the viewport is organized to suit the required task at hand, such as a pull-down virtual keyboard that is retracted when not in use, freeing up valuable space.

The present invention is intended to provide significant utility in numerous fields. Since the image can be viewed from 360 degrees, the device's application is suited for scenarios that require multi-viewing and multi-user interaction. This includes entertainment scenarios among numerous players, such as a game of virtual chess. Just as one would select a chess piece and move it, the same functions can be accomplished using the same movement as if they existed in the real world. This device is valuable to fields that are less "typing dependent" and more graphics related. For example, a 3D computer designer, who sculpts three-dimensional models,. does not find the mouse to be ideally suited for executing commands. Here the designer;can use his/her own hand. In another arrangement the device could be placed at the center of a conference table where various users can view and manipulate the viewed image during a board meeting. Since the projected image is not limited to a horizontal position, a vertically positioned image can be viewed from all sides including the rear, something not possible in a conventional monitor. Thus, the invention provides an interface that is more similar to a real world environment. The user manipulates an object, as if it were a clay model, with their hands and fingers, as if it existed in the physical world. This capability was not possible in the prior art.

DETAILED DESCRIPTION OF THE INVENTION

Figure 1:
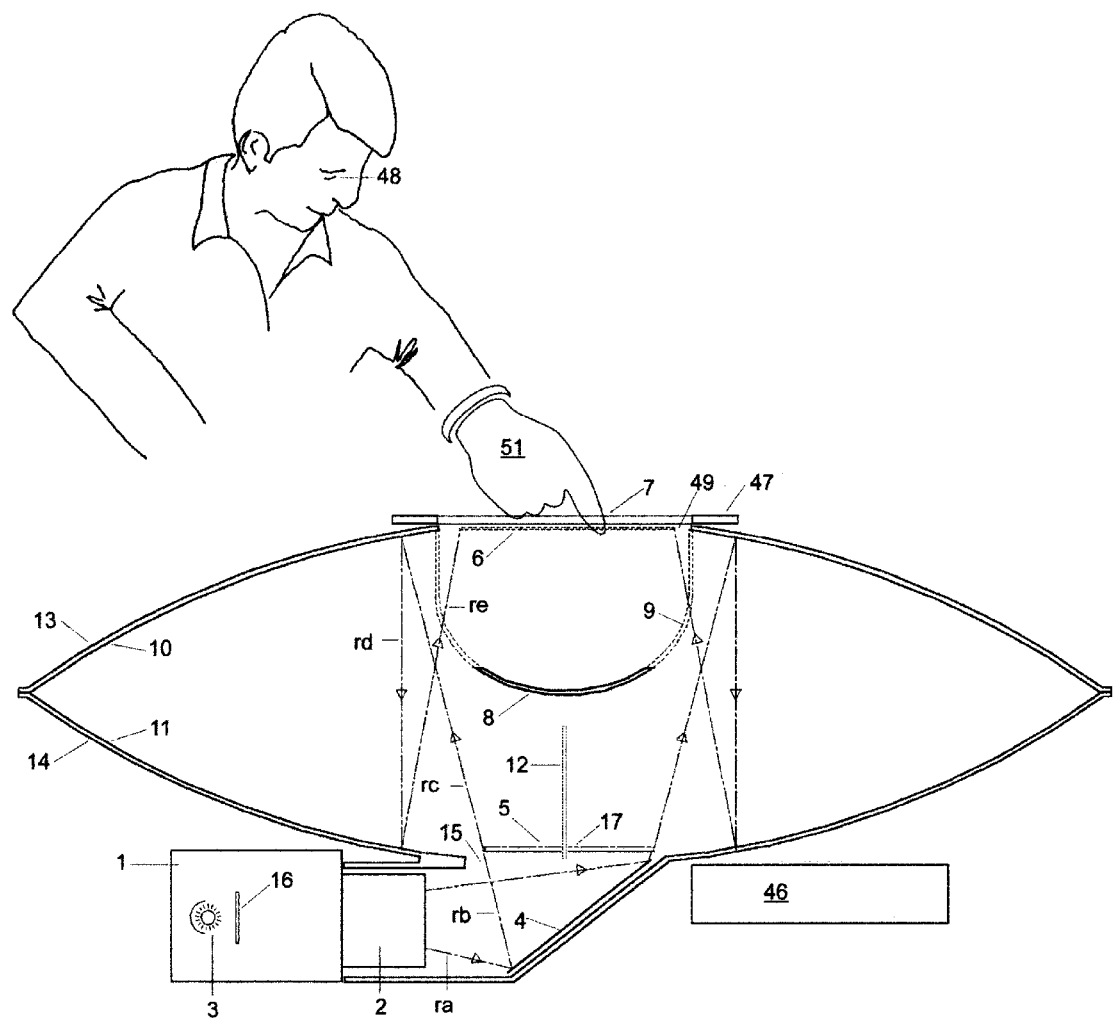
FIG. 1 is a longitudinal sectional view of the significant components of the invention including the ray diagram of the projected image.

The device of this invention contains four main components: an image generating device (1) such as a projector, a method of creating a real image (13,14), a method of tracking user input (47), and a method to communicate with the tracking device (47) and image generating device (1) such as a computer (46).

The image generating component can include several available technologies, including, but not limited to, high resolution full color images. A video/data projector (1) provides the most convincing results by supplying the required luminosity for ambient daylight viewing. The video/data projector (1) with its respective optics (2), allows for a close focused projected image (17) providing a 360 degree viewing angle of the dynamically generated real image (6). Since the image displayed (6) is dynamically generated by computer (46), the device allows for updated real-time viewing, such as video, or similar types of information found on computers. Other image generating devices, such as any controllable opacity surface having a light source placed behind, such as an (LCD), can be substituted, so long as the image can be viewed from acute angles. Although a cathode ray tube (CRT) television screen can be substituted, it does not provide as good a contrast. Furthermore, current LCD technology is limited by a more or less on-axis viewing in one or two of the directions.

While another approach may replace screen (5) with an LCD panel or other similar controllable opacity surface, a sufficient light source, placed behind produces the same result as a projector, as long as the image can be viewed from acute angles.

While coherent laser light can provide the high contrast, a highly complex set of rotating scanners and a set of three lasers are needed to provide a full color image utilizing red, green and blue light (RGB) to construct a color image. Furthermore the high computer intensive data needed to operate the lasers and scanners to generate an image increases the complexity and cost, limiting resolution and ultimately the quality of the image. In the preferred embodiment, various technologies may be employed in image/data projectors and include, but are not limited to, Digital Light Processing (DLP) developed by Texas Instruments, Micromirror (3M), LCD, or twisted nematic (TN) projectors. All of these can be utilized in component (1) of this invention. This allows the projected image (17) to be viewed from all angles, while having a controlled brightness by illumination source (3). A number of manufacturers such as Sony manufacture ultra-portable projectors, such as the CPJ-200 offering VGA resolution, the Plus U3-1080, projecting an XGA image which provide a bright enough image with sufficient image quality.

A mirror (4) is set-to direct the image onto a rear projection screen (5). While projector (1) can be oriented vertically, in which case mirror. 4 is not needed, in order to save space projector (1) was placed at a right angle to screen (5). Rear projection screen (5) is similar to a rear-projection system having a small diffuse reflection coefficient and negligible specular reflection. Light that is projected from behind is scattered diffusely, in the optimal case ideally diffused, such as in a Lambertian emitter. In addition, incoming stray light from the front is absorbed, and the material is non-reflective as much as possible to provide a high contrast ratio. A holographic diffuser, such as one manufactured by Physical Optics Corporation, coupled with a gray contrast filter, produces the desired result. In another embodiment, rear projection screen (5) is replaced by a backlit controllable opacity panel, such as a liquid crystal element allowing off-axis viewing.

The loss of light due to scattering of light as it hits small imperfections on the mirror surface and the number of times the light is bounced around mirrored surfaces (10 and 11) requires a sufficiently bright image for satisfactory results. For optimum use in ambient daylight, a light source greater than 800 lumens provides a bright enough image on the rear projection screen (5). This in turn projects a high enough contrast image which ultimately appears at the corresponding focal point (6) of top mirror (13) within viewport region (7) or top mirror aperture (49). Furthermore, rear projected image (17) does not illuminate the entire surface, allowing a frame of reference and a space surrounding the image (6). enhancing the illusion of a floating image.

From a high enough viewing angle, dependent on the geometry, curvature and position of mirrors (13 and 14), both the real image (6) and the rear screen image (5) are in view. An opaque surface (8), optimally light absorbing such as a matte black surface, is incorporated to block the direct view of rear screen (5). A plexiglass or ideally anti-reflective (AR) coated glass container or hemisphere (9) conceals screen (5) preventing double image viewing, while protecting the inside mirrored surface (11) from a misguided operator's hand (51) and dust or airborne particles from accumulating on the mirror surfaces (10 and 11). The specific location of opaque surface (8) is determined so as to not obstruct the emanating image light rays (rc and re), to not be interrupted by opaque surface (8) while obstructing the direct view of screen (5), from the operator or observer (48). This does not affect real image (6), as light rays traveling in a vertical direction have no mirrored surface to bounce off, due to the location of top viewport aperture (7). In another embodiment, screen (5) is oriented in a vertical orientation (12) to allow the image to be presented vertically. Projector (1) and/or mirror (4) would need to be repositioned to direct the image onto vertical surface (12). An obvious advantage to this is that the image can be viewed from all sides including the rear, something not possible in a conventional LCD or CRT.

The second component of the device includes a pair of parabolic or ellipsoid concave mirrors (13 and 14), with focal points facing each other on axis either positioned coaxially or near on-axis. Through the well established optical principle known as real imaging, described in the prior art (such as Elings patent '284) an object located at one of the focal points of one mirror appears at a different location or focal point of the second mirror. Each of the mirrors (13 and 14) are apertured (15 and 49) on either ends, allowing viewing from top viewport (7). The image is generated by any of the previously described technologies on panel (16) and is illuminated by the light source (3) which passes through projector optics (2). The light rays (ra) emanating from the projector (1) bounce off mirror (4) and light ray (rb), focus onto rear projection screen (5). The imaged light rays (rc) travel toward top mirrored surface (10) where the incident ray angle is equal to the reflected ray angle of rays (rd) which in turn become the incident rays for the bottom mirrored surface (11) and ultimately converge (re) into the viewed real image (6).

Due to the number of times light is reflected, the silvered surface (10 and 11) of mirrors (13 and 14) need to be as accurate as possible, a perfect concave surface to provide the best results, with minimal image distortion. By decreasing the size of the top viewport aperture (7) and bottom aperture (15) the viewing angle over the vertical increases while the image size decreases in size, restricted by the smaller viewport.

While ultimately the viewed real image (6) size depends on the actual dimensions of mirrors (13 and 14), by using different focal length mirrors, the real image can be enlarged or reduced in size from the rear projected image (17). An aperture diameter of about one-fourth the diameter of the mirror provides suitable results, yet an infinite number of variations in the overall geometry of the mirrors and aperture sizes can exist, resulting in various viewing angles and image sizes. Furthermore, mirrors (13 and 14) may be in contact with one another as shown in FIG. 1, or the mirrors may be separated while still facing one another, depending on the required viewing angles, image size and orientation.

Figure 2:
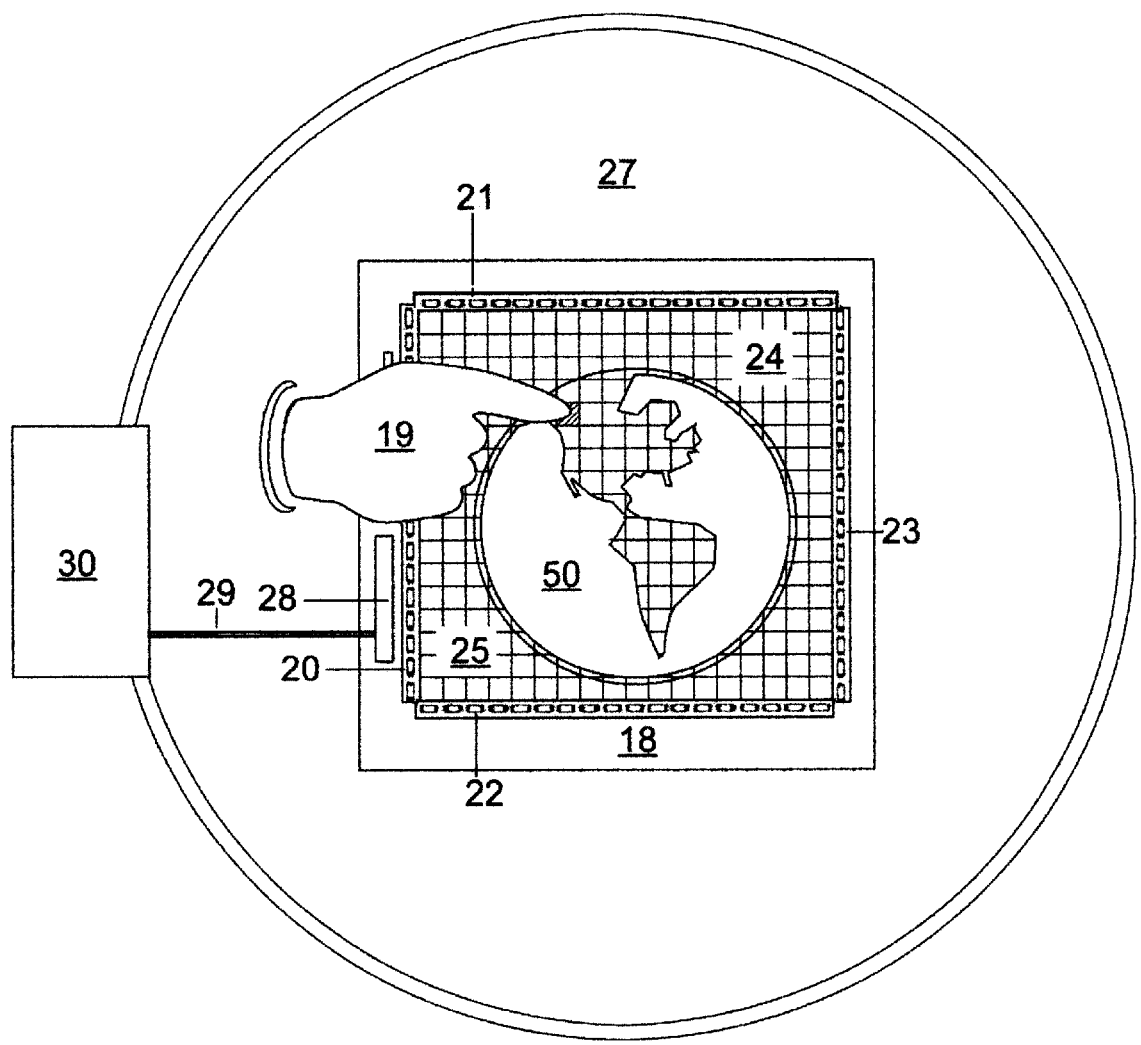
FIG. 2 is a plan view of the position detection device and viewport.

Referring now to FIG. 2, located above top mirror (27) input position detection device (18) allows user's hand (19) to interact with real image (50). This component functions in a similar fashion to the way a touchpad or touchscreen operates on most computers. Position detection device (18) translates absolute position analogous to operating a touchscreen on a computer. Touchscreens operate with their appropriate drivers by communicating with the operating system using generic pointing device software. Existing conventional touchpads rely on tactile contact with a surface in order for the device to detect position via acoustic wave, resistance or capacitance technologies. Because this invention relies on beams of light, there is no contact with any surface. The real image (50) appears on the same plane as the detectors/emitters (20–23), the user perceives actual "touching" of the floating image (50), in this example a map of a part of the world.

Detection device (18) functions by utilizing a plurality of light emitting means, such as light emitting diodes (LED's) (20 & 21), or lasers, with corresponding light detecting switches, such as transistors (22 & 23) at the opposite ends of detection device (18). The detection device (18) triggers a signal when the LED light beam is interrupted by a finger or stylus from reaching the transistor/detector at the opposite end. The signal correlates to the absolute position for that axis that is recognized by the emitter/detector pair for one of the axis while the other pair simultaneously detects the input for the other axis. By combining both positions a true x-y coordinate position is detected. LED (21) and detectors (22) correspond to the x axis of detection device (18) and LED (20) and detectors (23) correspond to the y axis of position detection device (18). The series of emitter/detectors (20, 21, 22 & 23) are equidistantly spaced and positioned adjacent to one another to provide an invisible optical grid (24).

By surrounding the entirety of viewport (25) with emitter/detector pairs in both directions on all four sides, an invisible grid (24) is created. Since the LED's operate at low wavelength infrared (IR) light, beyond human vision, they are never visible. The detectors operate as on/off bistate gates, responding to emitter IR wavelength and therefore are not accidentally triggered by ambient light. The IR light grid (26) produces a matrix of cells on a Cartesian x-y grid that correspond to, the number of detectable cells. By increasing the number of LED's and detectors the number of detectable cells increase and therefore the detectable resolution of the device. Limitations arise to the proximity of LED's and detectors to one another, as stray light from an LED may trigger the neighbor detector, instead of the intended detector at the opposite end. Techniques existing presently to ameliorate this include using lenses for emitting narrow collimated beams, further compressing the space between adjacent LED's/detectors. It is well known in the art that by rapidly switching alternating even and odd LED/detector pairs on and off, the resolution can be further increased by operating only every other pair at a time preventing, their close proximity from accidental "cross-talk". By replacing the LED's with coherent light emitting diodes, such as laser diodes, the controllable beam does not require the previously mentioned techniques to focus the light beam.

The on/off signal corresponding to the user's input location is sent to the detector controller (28) which interprets the signal with prewritten computer software, such as a universal mouse driver emulation that translates this information to a cursor location that is recognized by computer (30). Thus, the device works with existing software that recognizes an external input device such as a mouse. Position detection controller (28) sends commands via an interface cable (29) instructing computer (30) of the location of an object within the IR field. This object, typically the user's finger (19), or a stylus, is interpreted as an input corresponding to that location in an. x-y grid. Since the physical location of the detection device grid (24) is positioned on the same plane as the focal point of real image (50) the viewer perceives an interaction occurring with image (50). The physical overlap of detection grid (24) and the perceived location of real image (50) is critical, as it completes the user's experience of actual touching and interaction with image (50). Computer (30) receiving the instructions from-detection controller (28) interprets the position to be the location in this example to be the real image corresponding to Alaska (50).

Figure 3:
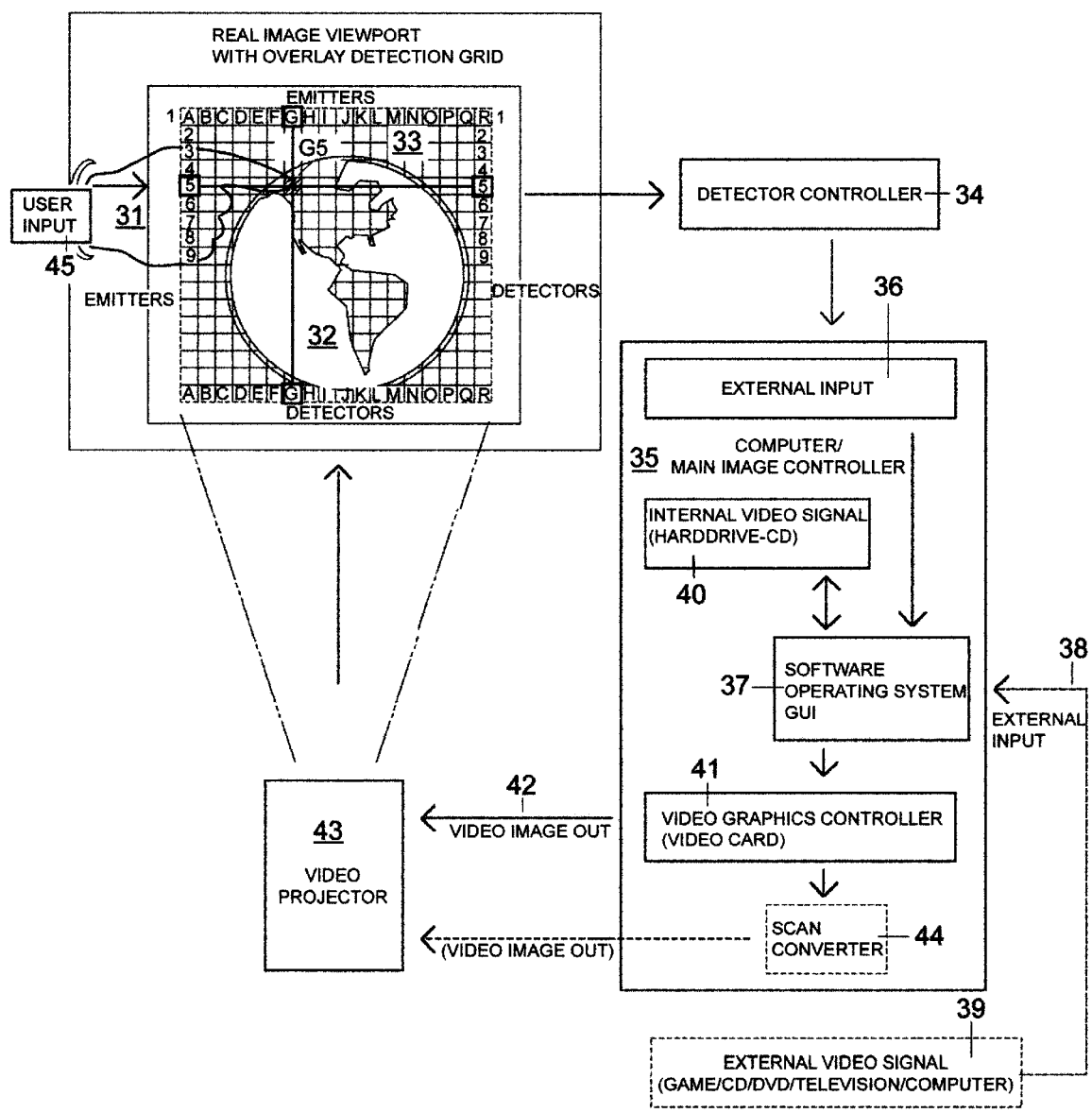
FIG. 3 is a block diagram of the processes that occur in the operation of the invention.

Referring to FIG. 3 there is shown a flow chart of the processes involved in the operation of the invention. User input (45) is determined by the user placing his or her finger (31), or stylus, within viewport (32) that is located on the same plane as detection device (51). In this example, the user input occurs at the intersecting coordinates of emitter/detector G and emitter/detector 5 (33). This selection of the intersecting pair G5 (33) correlates to the part of the image that is projected at that particular location. The position information is acknowledged by controller (34) by the interruption of IR light emanating from LED G and LED 5 from reaching corresponding detector G and detector 5. Controller (34) communicates with computer (35) either via a Universal Serial Bus (USB), parallel, serial port Input/output (I/O) or standard PS/2 interface (36) to connect external peripheral devices. This information is interpreted by software operating system (37) which contains preloaded software that outputs a solution depending on the purpose of the software. If for example a software application is written such as a world atlas, then by selecting that particular location the software instructs the computer to pull up a close-up detailed view of the selected area. In a gaming scenario, a chess piece real image located at G5 would have been selected and moved to the appropriate location by the user moving his or her hand to the new coordinate, in a similar way to the real world. Computer (35) has the ability to accept external video (38) via a video inport to receive external sources such as a DVD, television signal, external computer or CD-ROM (39). This provides flexibility to run software off CD-ROMs, such as the quick change of games. Furthermore, the device could be hooked up to a local area network or, via the internet, to provide long distance gaming partners. In addition, computer (35) has the ability to run information kept on an internal storage device such as hard drive (40) for preprogrammed functions. The program's solution is sent to a video graphics controller (41) via an accelerated graphics port (AGP) or Peripheral Component Interconnect (PCI) bus which translates the instructions into a video signal (42) sent to projector (43) that updates the image according to the users initial G-5 input. Depending on the type of signal, computer (35) and projector (43) may include a scan converter (44) which may be employed to generate a signal to be read by projector (43). Computer (35) therefore generates a new image that correlates to the user selecting G5, which is sent to projector (43) where it is reflected off the previously described mirrors, to be finalized in updated real image (52) in viewport (32).

The degree of interactivity is determined by the software running in the background, such as allowing for pull-down menus, such as those on a standard computer desktop environment. In this way, an image can be selected, manipulated and translated by the detection system that locates the position of the user's input. Similar to the interaction with a mouse, one can click and drag objects invany Graphic User Interface (GUI) operating system such as Windows® or Macintosh® operating system (OS) to run the point, click and drag subroutines.

Since the device of this invention relies on existing software, the device can be upgraded to incorporate the latest developments in GUI or software advances. Existing programs instruct the computer to "rollover", or change the image, to show that the user has selected that icon or part of the image. For example, on a Windows desktop, an icon changes to a darker color as soon as the user selects it. Since sometimes the floating real image (52) within viewport (32) is obstructed by the location of the finger or stylus, impeding the user/operator from viewing what occurs behind the pointing device or finger (31), modification to software can accommodate this possible inconvenience. Selection handles or the location within GUI where the selection of a particular item is recognized for that location can be positioned off-center, so as to allow the unobstructed view of the selected image at G-5 by the operator's finger (31). For example, in a scenario where a small chess piece at G5 is completely obstructed from view by the operator's finger, the software shifts its relative position off to one side. When the user intends on selecting the item in G5, he or she places their finger next to G5, such as F5 and the software recognizes the selection of G5 which remains in view by the operator at all times. In another scenario it might be difficult for the user to be aware that a selection has been executed, in this case audio feedback can accompany the selection process to help in recognizing that the intended image was selected.

At the present time, various software packages available to create interactive environments include, Macromedia Flash, Macromedia Director as well as numerous other applications. These software packages use Actionscripting and dynamically generated HTML (Hyper Text Markup Language) allowing for user controlled interactivity. By integrating this type of software, or similar software, the actual viewing experience is changed from a static one to an interactive one. This interactivity is not limited only to the use of this type of software, since existing operating systems such as Windows® and Mac® OS already integrate this into their operating systems in order for the user to communicate with the device.

The ability of real image (52) to be dynamic allows this zone to be a flexible workspace that serves various functions. These can include a floating keyboard or drawing pad in order to accommodate the current task. A certain portion of the viewing zone can be used as a "keyboard" when needed and hidden away when not needed, by minimizing a new window as one would in Windows 95 for example. Software by Mass Multimedia Company provides My-T-Touch can be adapted for this function. Since the "virtual keyboard" is not physically present, the keys can change characters to be customized for the user or change to accommodate the task at hand or to foreign languages or user defined characters.

The ability to work with existing software packages, integration of current video data signals and relative ease of operation due to the similarity to real world interaction make for a device that bridges the gap of computer user interface.

While a description of the preferred embodiment of the present invention has been given, further modifications and alterations will occur to those skilled in the art. It is therefore understood that all such modifications and alterations be considered as within the spirit and scope of the invention as defined by the appended claims.

I claim:

1. A dynamically generated interactive real imaging device comprising, image generating means, a pair of parabolic or ellipsoidal mirrors, comprising an upper mirror and a lower mirror, with focal points facing each other, each mirror having an aperture therein, said mirrors adapted to produce a real image, produced by the image generating means, at the aperture of the upper mirror, input position detection means adjacent the aperture of said upper mirror, said input position detection means comprising a plurality of light emitting means disposed opposite a plurality of light detection means, computer means adapted to read the position of any interruption of light between any light emitting means and any light detection means.

2. The device of claim 1 in which the image generating means comprises a controllable opacity surface having a light source behind.

3. The device of claim 2 further comprising opaque surface means adapted to block the direct view from the upper mirror aperture, of the backlit controllable opacity panel.

4. The device of claim 1 in which the image generating means comprises a video projector.

5. The device of claim 1 in which the light emitting means comprise light emitting diodes or lasers.

6. The device of claim 1 in which the light detection means comprise light detecting switches.

7. The device of claim 1 in which the light detection means comprise light detecting transistors.

8. The device of claim 1 further comprising a third mirror adapted to direct the image from the image generating means onto a rear projection screen.

9. The device of claim 8 further comprising opaque surface means adapted to block the direct view from the upper mirror aperture, of the rear projection screen.

10. The device of claim 1 further comprising computer software, operated by said computer means, adapted to dynamically adapt the real image, in response to said position detector means.

11. The device of claim 1 in which said position detector means comprises a plurality of light emitting diodes and an opposing plurality, of light detecting transistors on one axis and a plurality of light emitting diodes and an opposing plurality of light detecting transistors on another axis.

12. The device of claim 1 in which power is provided by an alternating current connector or by a battery pack.

13. A dynamically generated interactive real imaging device comprising, a dynamic image generating video projector or backlit controllable opacity panel, a pair of parabolic or ellipsoidal mirrors, comprising an upper mirror and a lower mirror, with focal points facing each other, each mirror having an aperture therein, said mirrors adapted to produce a real image, produced by the image generating means, at the aperture of the upper mirror, input position detection means located on the same plane as the aperture of said upper mirror, said input position detection means comprising a plurality of light emitting diodes disposed opposite a plurality of light detection transistors on the x axis and a plurality of light emitting diodes disposed opposite a plurality of light detection transistors on the y axis, creating an invisible optical grid, computer means adapted to read the position of any interruption of light between any light emitting diode and any light detection transistor, software adapted to modify said real image upon interaction with the real image.

14. The device of claim 13 in which the light emitting diodes operate with low frequency infrared light.

15. The device of claim 13 further comprising a third mirror adapted to direct the image from the image generating means onto a rear projection screen.

16. The device of claim 15 further comprising opaque surface means adapted to block the direct view from the upper mirror aperture, of the rear projection screen.

17. A method for creating an interface between a user and a dynamically generated real image comprising, creating a dynamic image utilizing a video projector, or backlit controllable opacity panel, passing the image to a pair of parabolic or ellipsoidal mirrors, comprising an upper mirror and a lower mirror, with focal points facing each other, each mirror having an aperture therein, said mirrors adapted to create a real image, produced by the image generating means, at the aperture of the upper mirror, placing input position detection means located on the same plane as the aperture of said upper mirror, said input position detection means comprising a plurality of light emitting diodes or lasers disposed opposite a plurality of light detection switches on the x axis and a plurality of light emitting diodes or lasers disposed opposite a plurality of light detection switches on the y axis, creating an invisible optical grid, computer means adapted to read the position of any interruption of light, created by the user, between any light emitting diode or laser and any light detection switch, allowing said user to interface directly with said real image, software adapted to modify said real image upon interaction with the real image by said user.

18. The method of claim 17 further comprising first reflecting the image created by the video or backlit controllable opacity panel off of a third mirror adapted to direct the image onto a rear projection screen.

19. The method of claim 18 further comprising blocking the direct view of the rear projection screen or backlit controllable opacity panel by placing an opaque surface between the rear projection screen and the aperture of the upper mirror.

20. The method of claim 17 further comprising passing the location information of user interaction with the optical grid to the computer software for action by the software.

* * * * *